(12) United States Patent
Pedersen

(10) Patent No.: US 11,234,873 B2
(45) Date of Patent: Feb. 1, 2022

(54) HEIGHT ADJUSTABLE WHEELCHAIR DOCKING SYSTEM

(71) Applicant: MASKINFABRIK DAHL ENGINEERING V/CLAUS DAHL PEDERSEN, Thisted (DK)

(72) Inventor: Claus Dahl Pedersen, Thisted (DK)

(73) Assignee: Maskinfabrik Dahl Engineering V/Claus Dahl Pedersen

( * ) Notice: Subject to any disclaimer, the term of this patent is extended or adjusted under 35 U.S.C. 154(b) by 200 days.

(21) Appl. No.: 16/500,210

(22) PCT Filed: Mar. 26, 2018

(86) PCT No.: PCT/EP2018/057608
§ 371 (c)(1),
(2) Date: Oct. 2, 2019

(87) PCT Pub. No.: WO2018/184884
PCT Pub. Date: Oct. 11, 2018

(65) Prior Publication Data
US 2021/0100701 A1    Apr. 8, 2021

(30) Foreign Application Priority Data
Apr. 4, 2017    (DK) .......................... PA 2017 00233

(51) Int. Cl.
*A61G 3/08*    (2006.01)
*B62D 65/02*   (2006.01)

(52) U.S. Cl.
CPC .......... *A61G 3/0808* (2013.01); *B62D 65/02* (2013.01)

(58) Field of Classification Search
CPC ......... A61G 3/0808; A61G 3/08; B60N 2/245
See application file for complete search history.

(56) References Cited

U.S. PATENT DOCUMENTS

| 4,389,056 A | * | 6/1983 | Tenniswood | ......... A61G 3/0808 |
| | | | | 280/304.1 |
| 4,958,979 A | * | 9/1990 | Svensson | ............... A61G 3/067 |
| | | | | 414/549 |

(Continued)

FOREIGN PATENT DOCUMENTS

| JP | H02 141563 U | 11/1990 |
| NL | 8501237 A | 12/1986 |

OTHER PUBLICATIONS

International Search Report, International Application No. PCT/EP2018/057608, dated Jun. 21, 2018, 3 pages.

(Continued)

*Primary Examiner* — Jacob J Cigna
*Assistant Examiner* — Michael W Hotchkiss
(74) *Attorney, Agent, or Firm* — Ware, Fressola, Maguire & Barber LLP

(57) ABSTRACT

A height adjustable wheelchair docking system for releasably securing a wheelchair to the floor of a transport vehicle includes: a base frame with an open end, and for rigid attachment to the floor of a transport vehicle; a middle frame for sliding back and forth in a horizontal direction within the base frame and through the open end; means to slide the middle frame in relation to the base frame; and a top frame for covering at least a part of the base frame and middle frame, and to move up and down in a vertical direction in relation to the base frame when the middle frame is sliding back and forth in a horizontal direction within the base frame and through the open end. The top frame further includes a female or male docking fixture for locking engagement with a male or female docking fixture on a wheelchair.

18 Claims, 16 Drawing Sheets

(56) References Cited

U.S. PATENT DOCUMENTS

| | | | | |
|---|---|---|---|---|
| 4,973,022 | A * | 11/1990 | Mayland | A61G 3/0808 188/DIG. 1 |
| 4,995,775 | A | 2/1991 | Gresham | |
| 5,388,937 | A * | 2/1995 | Farsai | B60P 3/077 188/32 |
| 5,489,170 | A * | 2/1996 | Inoue | A61G 3/0808 296/63 |
| 5,524,952 | A * | 6/1996 | Czech | B60N 2/14 296/65.12 |
| 6,077,025 | A * | 6/2000 | Budd | A61G 3/06 414/546 |
| 6,238,168 | B1 * | 5/2001 | Cohn | A61G 3/061 414/537 |
| 6,238,169 | B1 * | 5/2001 | Dupuy | A61G 3/06 414/546 |
| 6,962,383 | B2 * | 11/2005 | Takenoshita | B60N 2/245 296/65.03 |
| 7,229,238 | B2 | 6/2007 | Girardin et al. | |
| 7,429,155 | B2 * | 9/2008 | Sakano | A61G 3/0808 410/7 |
| 7,753,630 | B2 * | 7/2010 | Jeppsson | A61G 3/0808 410/7 |
| 7,789,447 | B2 * | 9/2010 | Tomaiwa | B60N 2/067 296/65.11 |
| 7,798,761 | B2 * | 9/2010 | Goodrich | A61G 3/061 414/462 |
| 8,936,295 | B2 * | 1/2015 | Slungare | B60N 2/245 296/65.12 |
| 9,375,369 | B2 * | 6/2016 | Bruns | A61G 3/062 |
| 9,974,702 | B2 * | 5/2018 | Gallingani | A61G 3/063 |
| 2001/0024604 | A1 * | 9/2001 | Budd | A61G 3/0808 410/7 |
| 2001/0055520 | A1 * | 12/2001 | Budd | A61G 3/08 410/7 |
| 2002/0064433 | A1 | 5/2002 | Costantin | |
| 2006/0104775 | A1 * | 5/2006 | Kasten | B60P 1/4457 414/546 |
| 2006/0250011 | A1 * | 11/2006 | Sawdy | B60N 2/14 297/362 |
| 2009/0214314 | A1 * | 8/2009 | Girardin | A61G 3/0808 410/7 |
| 2010/0148555 | A1 * | 6/2010 | Lung | B60N 2/0232 297/344.14 |
| 2010/0329831 | A1 * | 12/2010 | Tornese | A61G 3/0254 414/544 |
| 2014/0219753 | A1 * | 8/2014 | Alasfour | B60P 1/4457 414/501 |
| 2014/0356116 | A1 * | 12/2014 | Hermanson | B60P 1/433 414/519 |
| 2014/0356118 | A1 * | 12/2014 | Friedlinghaus | A61G 3/0808 414/523 |
| 2018/0193210 | A1 * | 7/2018 | Aitchison | B60N 2/14 |
| 2021/0007917 | A1 * | 1/2021 | Hargraves | B60N 2/10 |

OTHER PUBLICATIONS

Written Opinion of the International Search Authority, International Application No. PCT/EP2018/057608, dated Jun. 21, 2018, 5 pages.
Danish Patent and Trademark Office, Search Report for application No. PA 2017 00233, dated Sep. 11, 2017, 7 pages.

* cited by examiner

HEIGHT ADJUSTABLE WHEELCHAIR DOCKING SYSTEM

TECHNICAL FIELD OF THE INVENTION

The present invention relates to transportation of wheelchair users, and more particularly to means adapted to secure the wheelchair into a transport vehicle.

BACKGROUND OF THE INVENTION

The welfare and safety of persons being transported in wheelchairs is of ever increasing concern, and many jurisdictions have enacted stringent safety requirements for devices to secure the wheelchair into the transport vehicle and the occupant into the wheelchair. Numerous solutions, most of which are reasonably effective, have been suggested in the prior art, but they frequently require the attachment of a plurality of straps or the like to one or more anchor points in the transport vehicle. After attachment, the straps must be tightened either by the wheelchair occupant or by an attendant. Often, the wheelchair occupant has neither the physical strength nor the manual dexterity to manipulate the necessary straps and the like. This means that the attendant, or vehicle driver, must spend several minutes securing each wheelchair in his/her charge into the vehicle. There have been some attempts to provide self-attachment devices in the past and attention is directed to U.S. Pat. No. 7,229,238 in which a locking mechanism is secured beneath a wheelchair and releasably locked to a docking station similarly mounted under the wheelchair, on the floor of the vehicle. While reasonably effective in certain circumstances, it does not solve the problem that wheelchairs are constructed differently, and that the distance between the locking mechanism secured beneath the wheelchair and the docking station thus will vary. Hence, such a solution is impractical for transport vehicles used for public service, or for service of different passengers in general.

US20020064433 discloses a restraint device for restraining in a vehicle a mobile occupant carrier having a frame and a wheel base. The restraint device comprises: (a) two adaptors adapted to be rigidly mounted to opposite sides of the frame; (b) a bracket assembly adapted to engage said adaptors, wherein said bracket assembly comprises a single horizontal latch interface, and wherein said bracket assembly is adapted to rigidly connect said adaptors to said horizontal latch interface; and (c) a docking assembly adapted to be rigidly mounted to the vehicle. The docking assembly comprises a single latching mechanism adapted to engage said single horizontal latch interface. The horizontal latch interface is engaged with said latching mechanism. The position of the mobile occupant carrier with respect to the vehicle resists displacement or horizontal rotation should the vehicle be involved in a collision or other vehicular accident.

Thus, there is a need for an automatic wheelchair docking system for transport vehicles used for public service, or for service of different passengers in general, that can, if desired, be operated automatically by the attendant from a central location, or that can be operated manually by either the wheelchair occupant or by the attendant.

SUMMARY OF THE INVENTION

A first aspect relates to a height adjustable wheelchair docking system adapted for releasably securing a wheelchair to the floor of a transport vehicle comprising:

a base frame with an open end, and adapted for rigid attachment to the floor of a transport vehicle;

a middle frame adapted for sliding back and forth in a horizontal direction within the base frame and through the open end;

means configured to slide the middle frame in relation to the base frame; and a top frame adapted for covering at least a part of the base frame and middle frame, and adapted to move up and down in a vertical direction in relation to the base frame when the middle frame is sliding back and forth in a horizontal direction within the base frame and through the open end; wherein the top frame further comprises a female or male docking fixture adapted for locking engagement with a male or female docking fixture on a wheelchair.

In one or more embodiments, the middle frame comprises guide tracks in the bottom part, and wherein at least a part of a fastening means adapted for providing rigid attachment of the base frame to the floor of a transport vehicle is configured for sliding and/or rollable engagement with said guide tracks. This configuration allows for a very compact docking system.

In one or more embodiments, the fastening means is a bolt, and wherein a part of the bolt is configured for sliding engagement with said guide tracks.

In one or more embodiments, the fastening means is a bolt comprising a rolling element (e.g. a roller bearing) adapted to be rollable engaged with the sides of said guide tracks. The rolling element reduces the wear of the bolt, when the middle frame is sliding relative to the base frame.

In one or more embodiments, the base frame and the middle frame each comprises one member of a pair of oppositely angled guide tracks in their side wall; wherein the top frame comprises a channel in its side wall; wherein the pair of oppositely angled guide tracks and the channel together form a channel in which a guide pin is positioned. This configuration allows for a very compact docking system.

In one or more embodiments, the guide pin comprises a rolling element (e.g. a roller bearing) adapted to be rollable engaged with the sides of the oppositely angled guide tracks. The rolling element reduces the wear of the bolt, when the middle frame is sliding relative to the base frame.

In one or more embodiments, the means configured to slide the middle frame in relation to the base frame comprises a motor coupled to a threaded lever, and a threaded anchoring unit adapted for engaging with the threaded lever; wherein a) the motor coupled to the threaded lever is attached to the base frame, and the threaded anchoring unit is attached to the middle frame, or b) the threaded anchoring unit is attached to the base frame, and the motor coupled to the threaded lever is attached to the middle frame.

In one or more embodiments, the means configured to slide the middle frame in relation to the base frame is configured to horizontally slide the middle frame to a predefined position relative to the base frame in response to a user input signal. Thereby, the user may adjust the height according to his/her individual needs; e.g. if the user has different types of wheelchairs, or if the height adjustable wheelchair docking system is used in transport vehicles used for public service, or for service of different passengers in general.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED DESCRIPTION OF THE INVENTION

Figure 1:
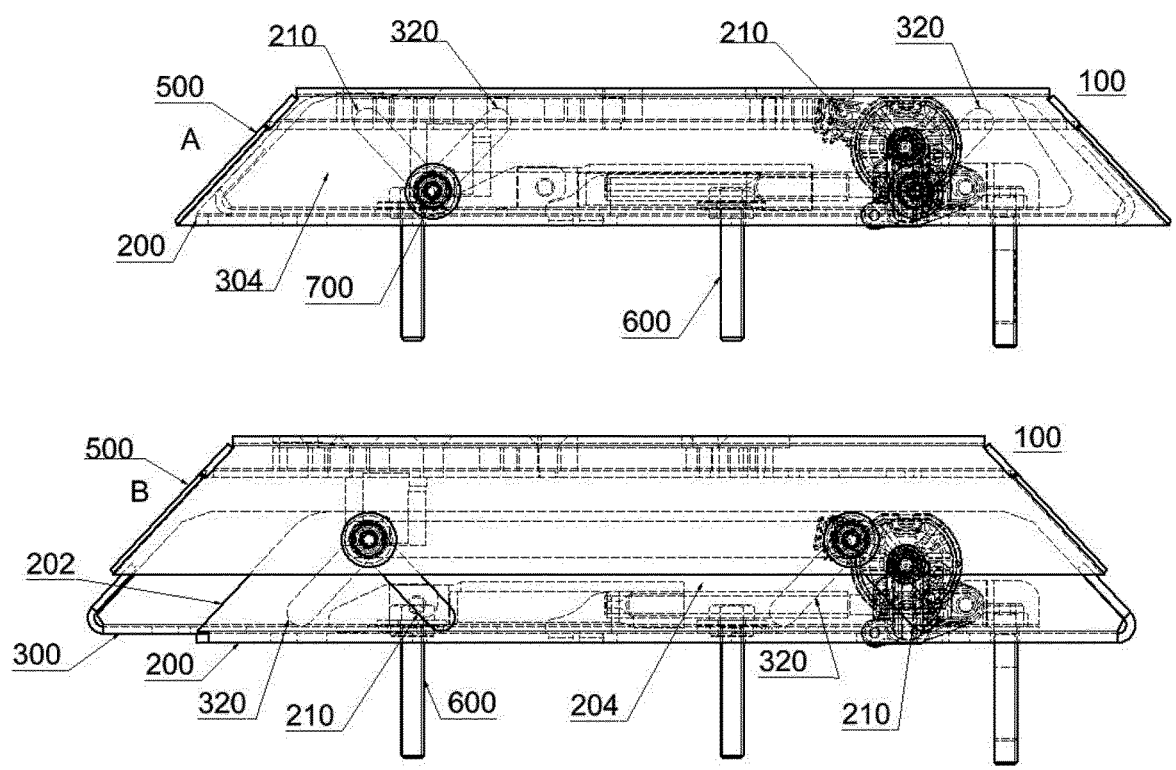
FIG. 1 shows a transparent side view of a height adjustable wheelchair docking system in accordance with various embodiments of the invention, where A is the docking system in the lowest configuration, and B is the docking system in the tallest configuration.

Referring to FIG. 1, the general scheme of the invention is shown. FIG. 1 shows a transparent side view (transparent to better understand how the different components move in relation to each other) of a height adjustable wheelchair docking system 100, where A is the docking system in the lowest configuration, and B is the docking system in the tallest configuration. Hence, the height of the docking system may be varied from the lowest configuration to the tallest configuration, and vice versa. The height adjustable wheelchair docking system 100 comprises a base frame 200, a middle frame 300, and a top frame 500 (best seen in the tallest configuration B of FIG. 1).

The base frame 200 comprises an open end 202, and is adapted for rigid attachment to the floor of a transport vehicle, e.g. with bolts 600. The middle frame 300 is adapted for sliding back and forth in a horizontal direction within the base frame 200 and through the open end 202.

Figure 11:
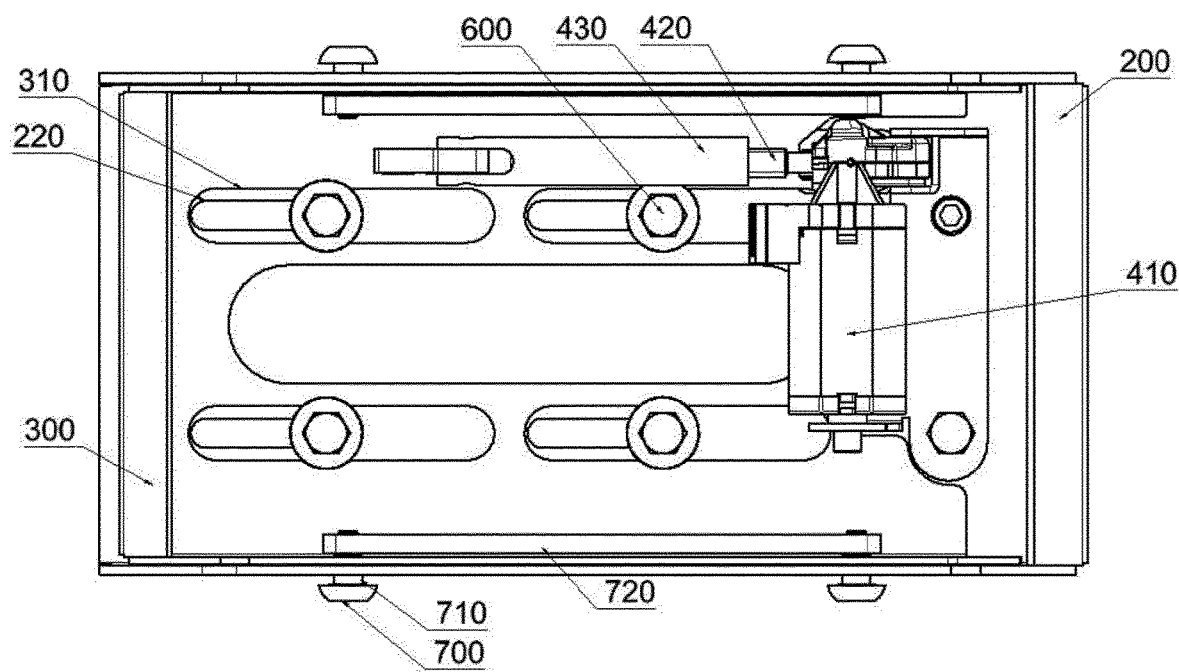
FIG. 11 shows a top view of a docking station in accordance with various embodiments of the invention, where the top frame has been removed, and where the middle frame is moved to farthest right position, corresponding to a position where the docking station will be in the lowest configuration.
Figure 12:
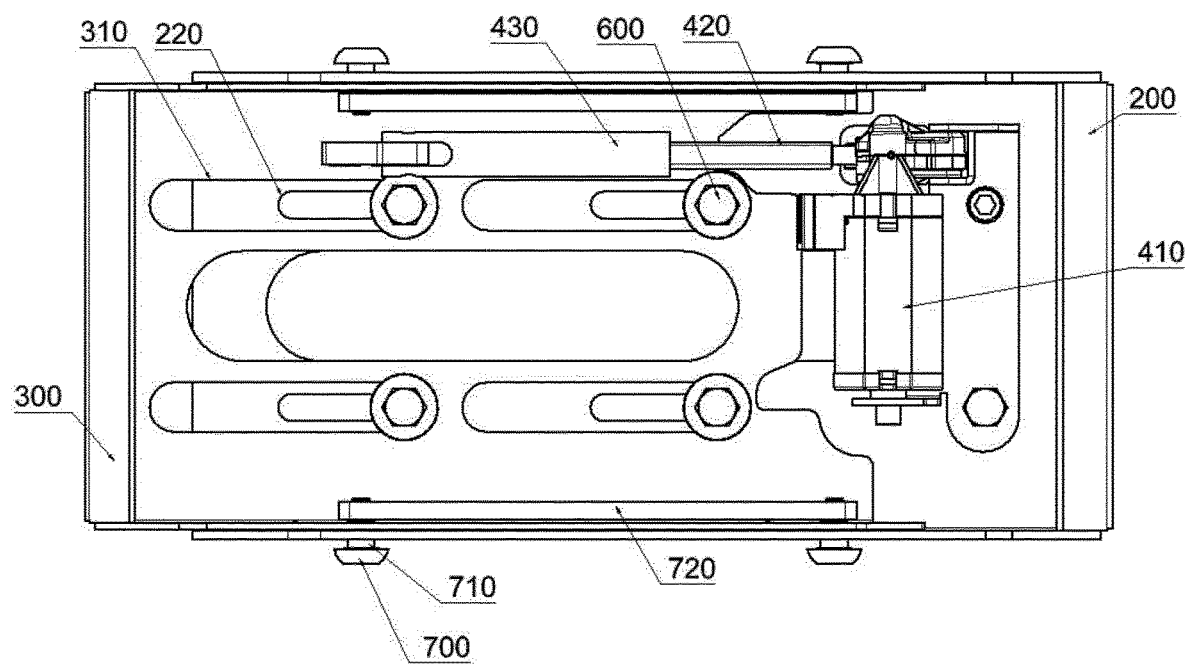
FIG. 12 shows a top view of a docking station in accordance with various embodiments of the invention, where the top frame has been removed, and where the middle frame is moved to farthest left position, corresponding to a position where the docking station will be in the tallest configuration.

The height adjustable wheelchair docking system 100 also comprises means configured to slide the middle frame 300 in relation to the base frame 200. Such means could e.g. be a motor 410, a threaded lever 420, and a threaded anchoring unit 430, as shown in FIGS. 11 and 12.

Figure 4:
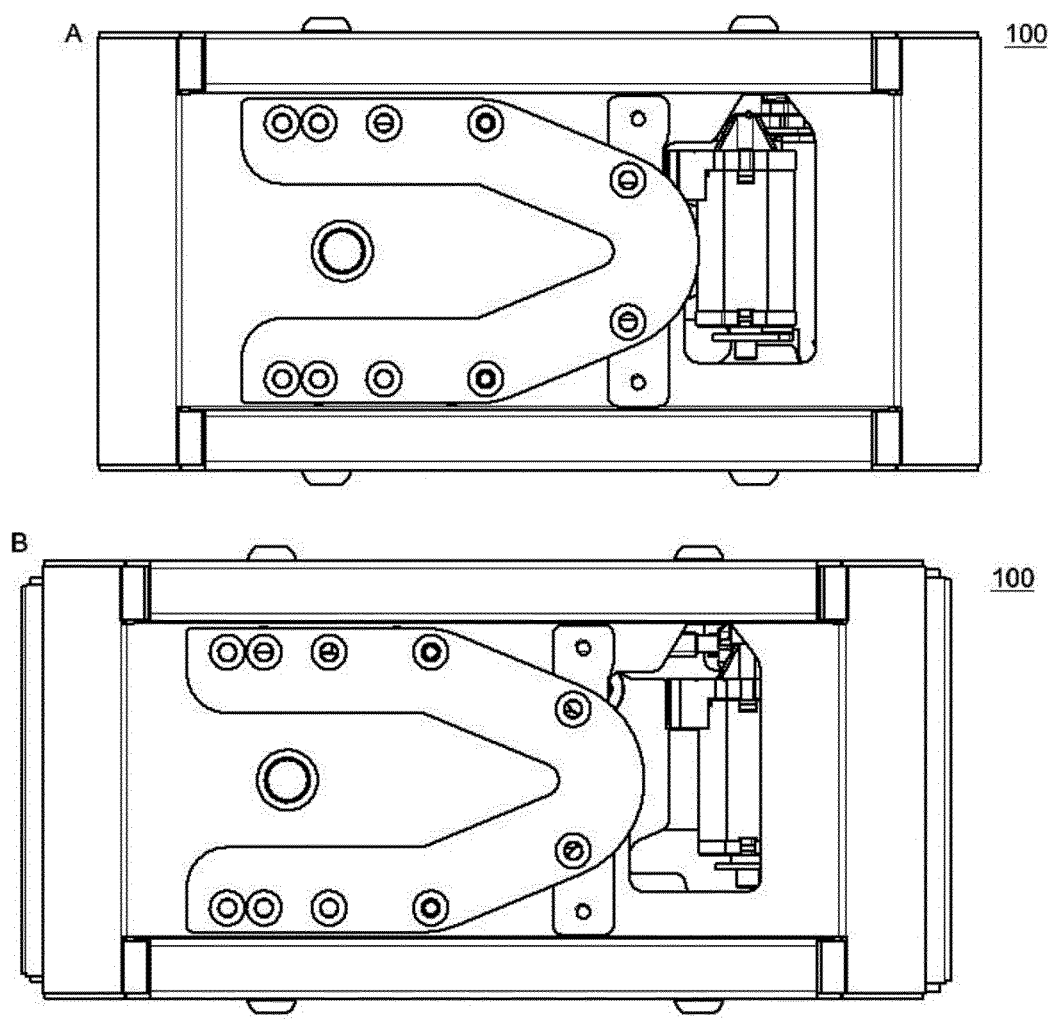
FIG. 4 shows a top view of a height adjustable wheelchair docking system in accordance with various embodiments of the invention, where A is the docking system in the lowest configuration, and B is the docking system in the tallest configuration.

The top frame 500 is adapted to cover and encompass the base frame 200 and middle frame 300, and in its entirety adapted to move up and down in a vertical direction in relation to the base frame 200 when the middle frame 300 is sliding back and forth in a horizontal direction within the base frame 200 and through the open end 202. The top frame 500 further comprises a female docking fixture adapted for locking engagement with a male docking fixture on a wheelchair (FIG. 4).

Figure 14:
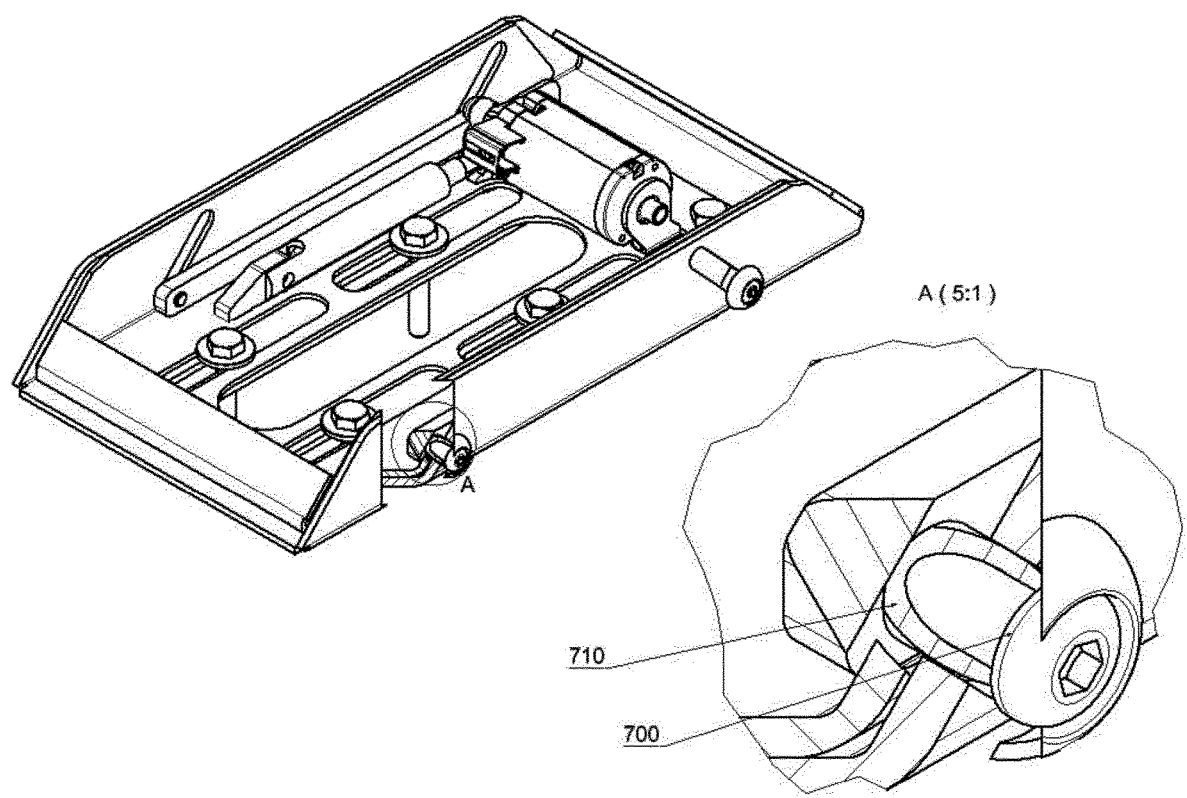
FIG. 14 shows a cutout of the sidewalls of the base frame and middle frame through a guide pin and a rolling element.
Figure 16:
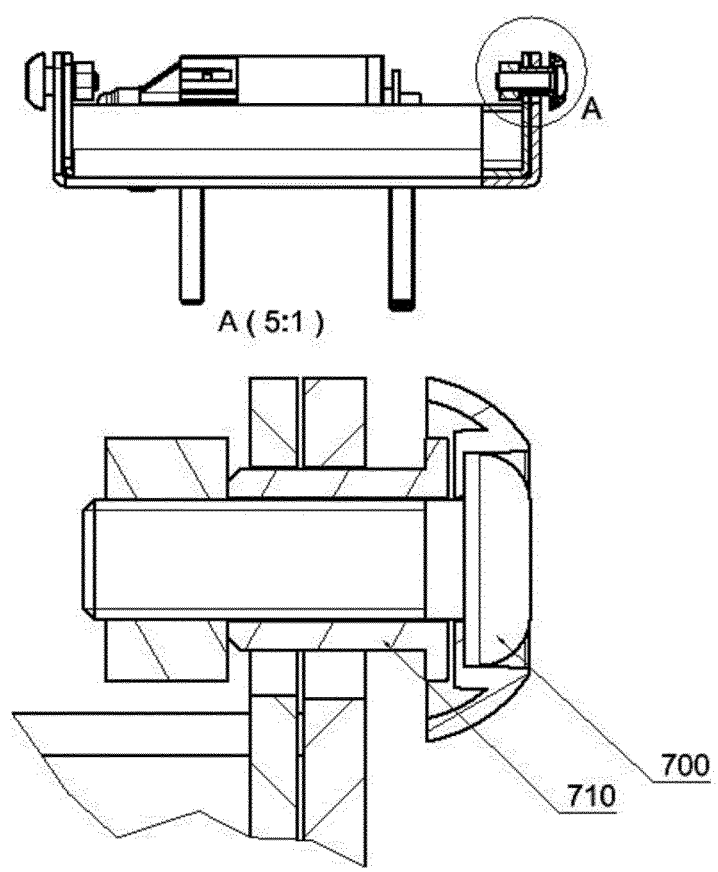
FIG. 16 shows a transverse cross-section of a docking station in accordance with various embodiments of the invention, through a guide pin and a rolling element.

The base frame 200 and the middle frame 300 each comprises one member of a pair of oppositely angled guide tracks 210, 320 in their side wall 204, 304. The top frame 500 comprises a channel 510 in its side wall 502. The pair of oppositely angled guide tracks 210, 320 and the channel 510 together form a channel in which a guide pin 700 is positioned. The different positions of the guide pin 700 within the pair of oppositely angled guide tracks 210, 320 corresponding to the lowest configuration and the tallest configuration may be seen in the configuration A and the configuration B in FIG. 1, respectively. Intermediate positions may, of course, also be possible. Notice that the guide track 320 and the guide pin 700 move relative to the guide track 210. The guide pin 700 comprises a rolling element 710 adapted to be rollably engaged with the sides of the oppositely angled guide tracks 210, 320 (FIGS. 14 and 16).

Figure 2:
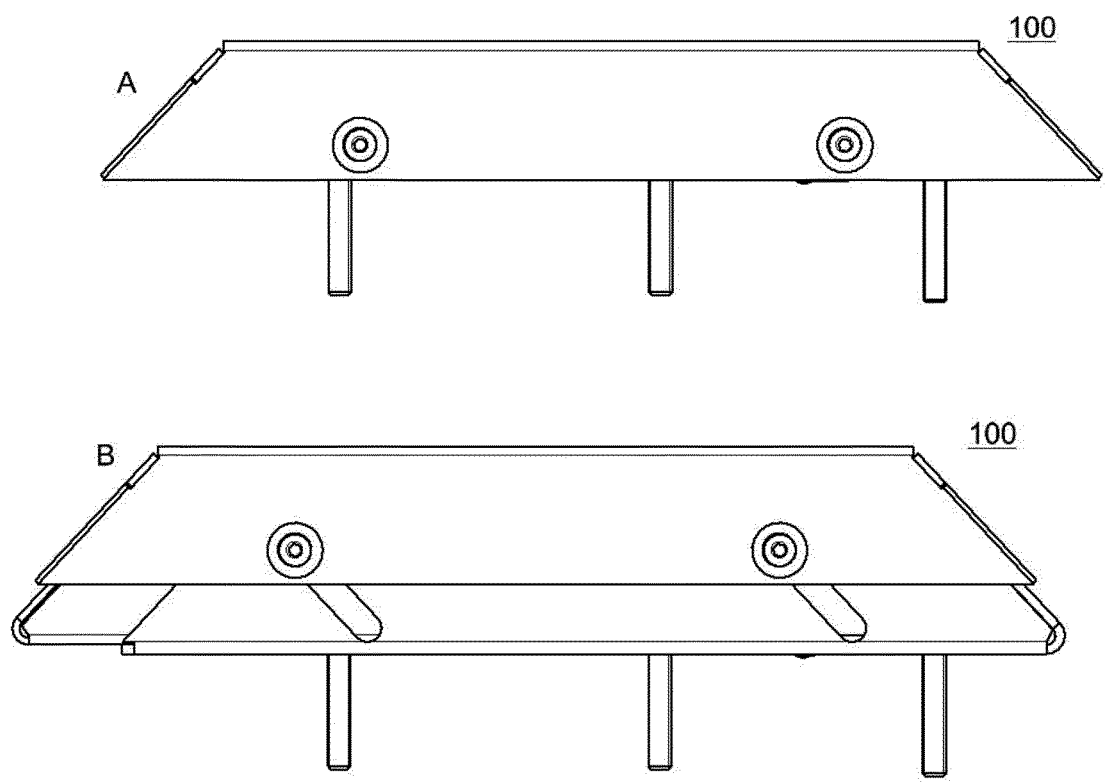
FIG. 2 shows a side view of a height adjustable wheelchair docking system in accordance with various embodiments of the invention, where A is the docking system in the lowest configuration, and B is the docking system in the tallest configuration.

FIG. 2 shows the same side view as FIG. 1, but in an opaque way, where A is the docking system in the lowest configuration, and B is the docking system in the tallest configuration.

Figure 3:
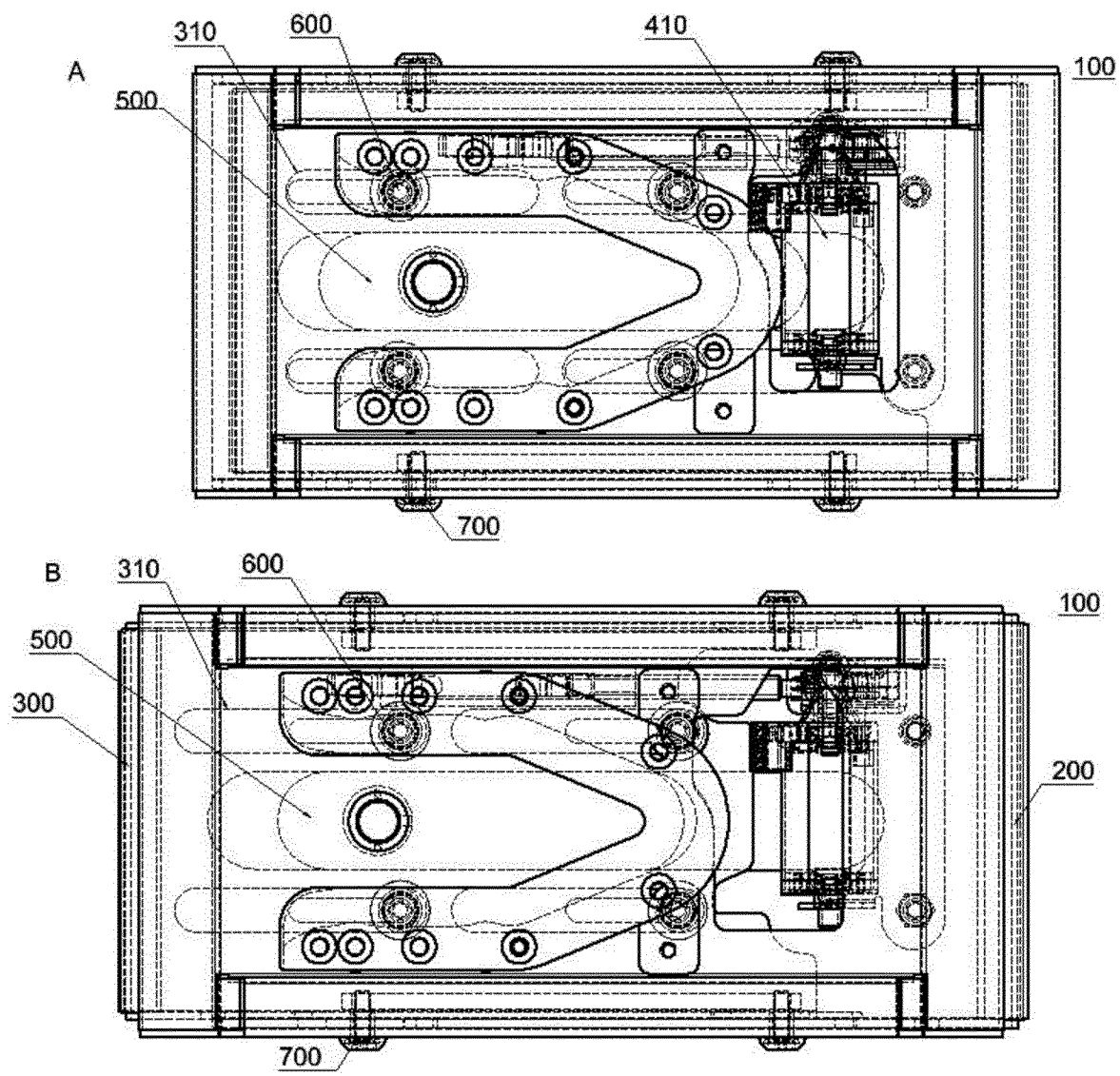
FIG. 3 shows a transparent top view of a height adjustable wheelchair docking system in accordance with various embodiments of the invention, where A is the docking system in the lowest configuration, and B is the docking system in the tallest configuration.
Figure 7:
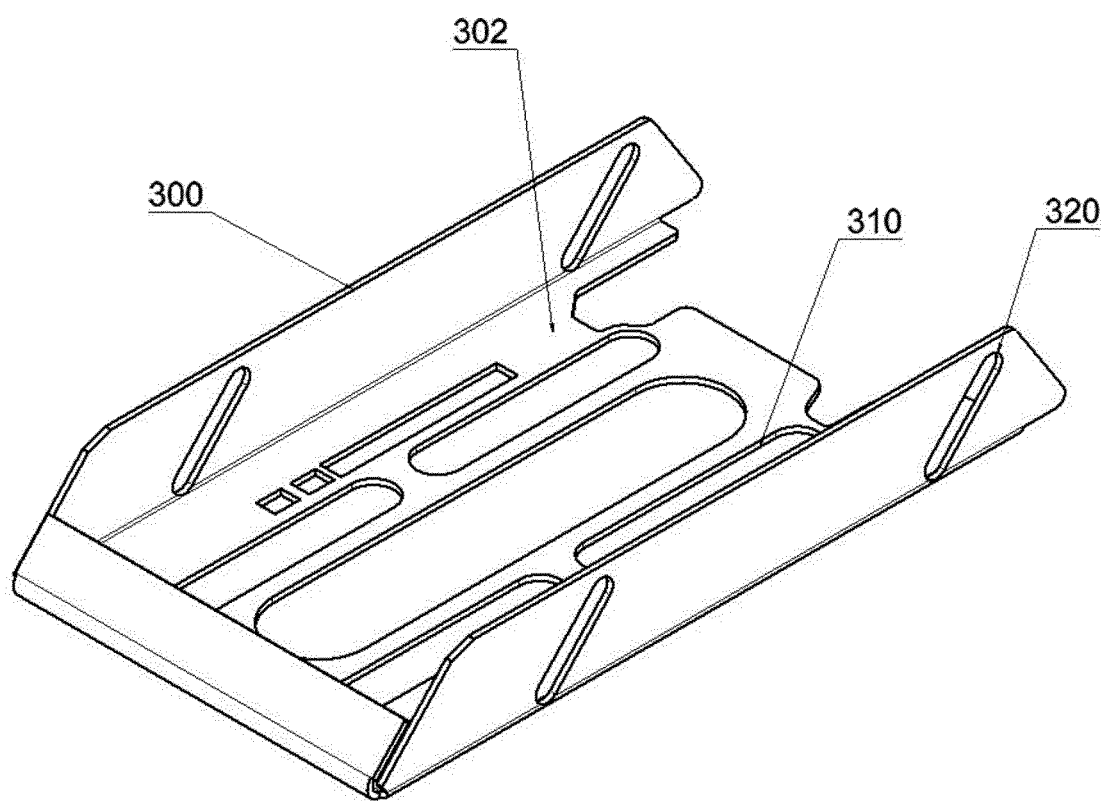
FIG. 7 shows an isometric view of a middle frame in accordance with various embodiments of the invention.
Figure 13:
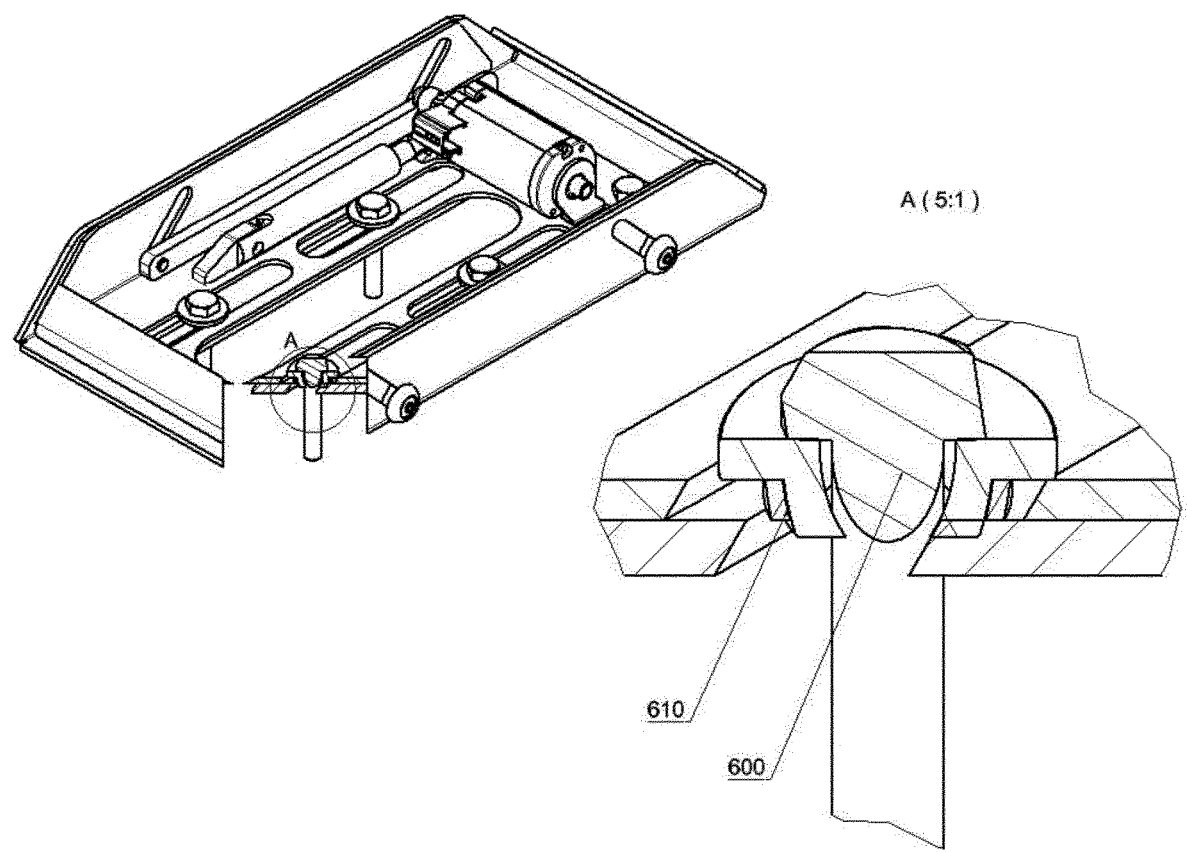
FIG. 13 shows a cutout of the sidewalls of the base frame and middle frame through a fastening means and a rolling element.
Figure 15:
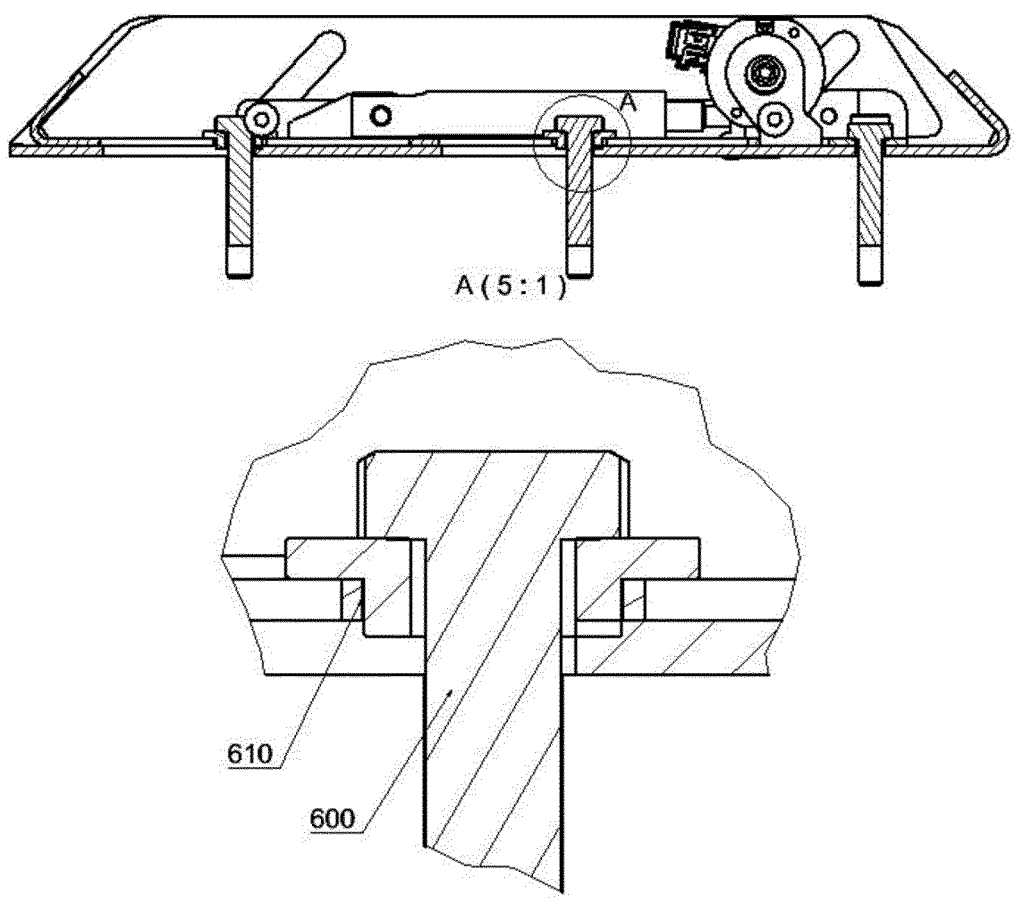
FIG. 15 shows a longitudinal cross-section of a docking station in accordance with various embodiments of the invention, through a fastening means and a rolling element.

FIG. 3 shows a transparent top view of a height adjustable wheelchair docking system in accordance with various embodiments of the invention, where A is the docking system in the lowest configuration, and B is the docking system in the tallest configuration. The middle frame 300 is shown comprising guide tracks 310 in the bottom part 302 (see also FIG. 7). At least a part of a fastening means (here the head of a bolt 600) adapted for providing rigid attachment of the base frame 200 to the floor of a transport vehicle is configured for rollable engagement with said guide tracks 310. The different positions of the bolt 600 within the guide tracks 310 corresponding to the lowest configuration A and the tallest configuration B may be seen in FIG. 3. Intermediate positions may, of course, also be possible. Notice that it is the guide track 310 that moves relative to the bolt 600. The bolt 600 comprises a rolling element 610 adapted to be rollably engaged with the sides of said guide tracks 310 (FIGS. 13 and 15).

FIG. 4 shows a top view of a height adjustable wheelchair docking system in accordance with various embodiments of the invention, where A is the docking system in the lowest configuration, and B is the docking system in the tallest configuration.

Figure 5:
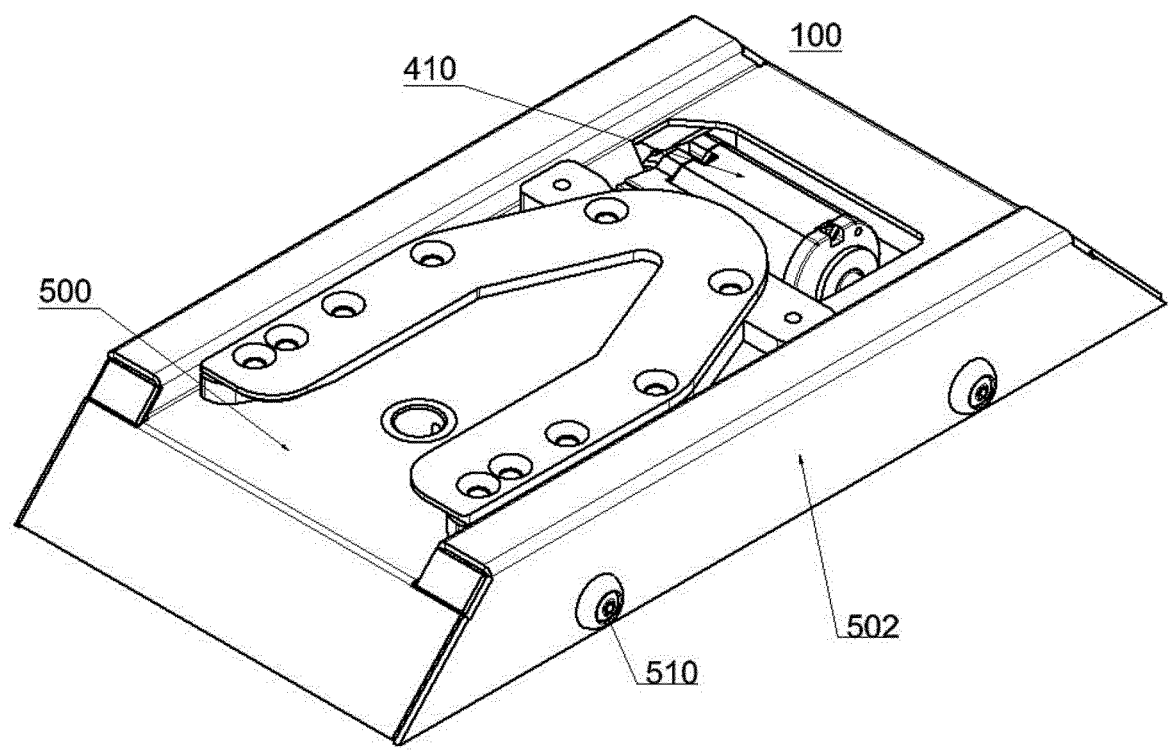
FIG. 5 shows an isometric view of a docking station in accordance with various embodiments of the invention, where the middle frame is moved to farthest right position, corresponding to a position where the docking station will be in the lowest configuration.

FIG. 5 shows an isometric view of a docking station in accordance with various embodiments of the invention, where the middle frame is moved to a farthest right position, corresponding to a position where the docking station will be in the lowest configuration.

Figure 6:
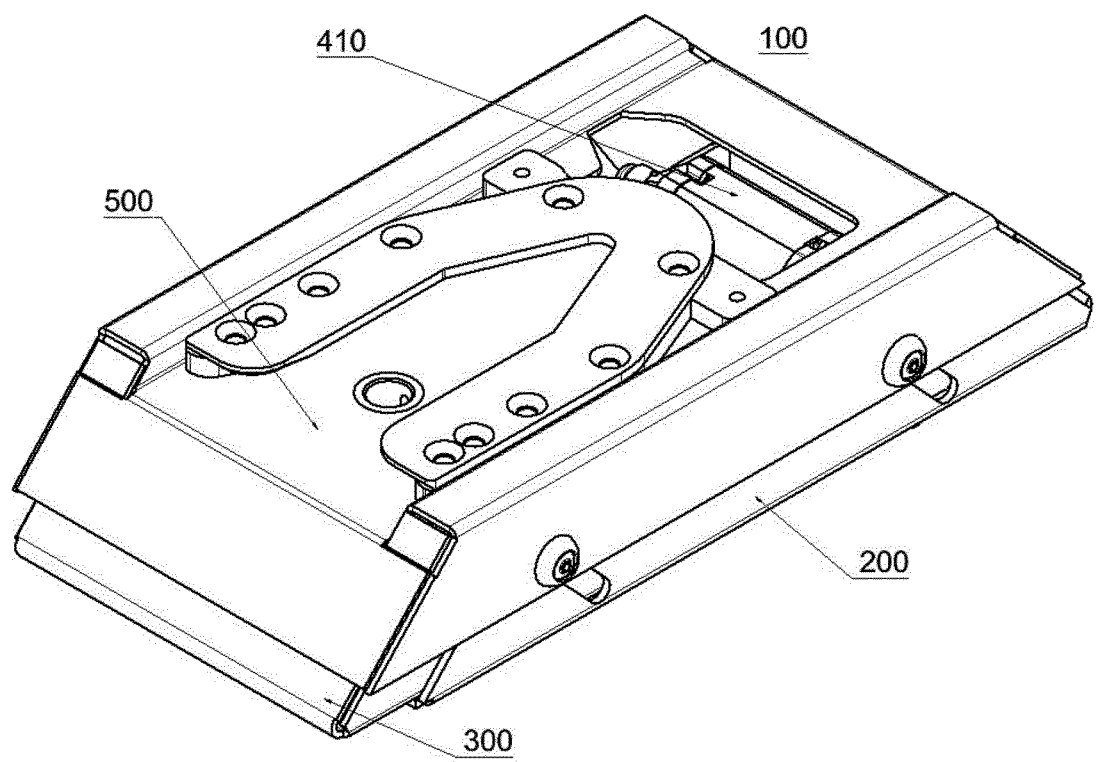
FIG. 6 shows an isometric view of a docking station in accordance with various embodiments of the invention, where the middle frame is moved to farthest left position, corresponding to a position where the docking station will be in the tallest configuration.

FIG. 6 shows an isometric view of a docking station in accordance with various embodiments of the invention, where the middle frame is moved to a farthest left position, corresponding to a position where the docking station will be in the tallest configuration.

Figure 8:
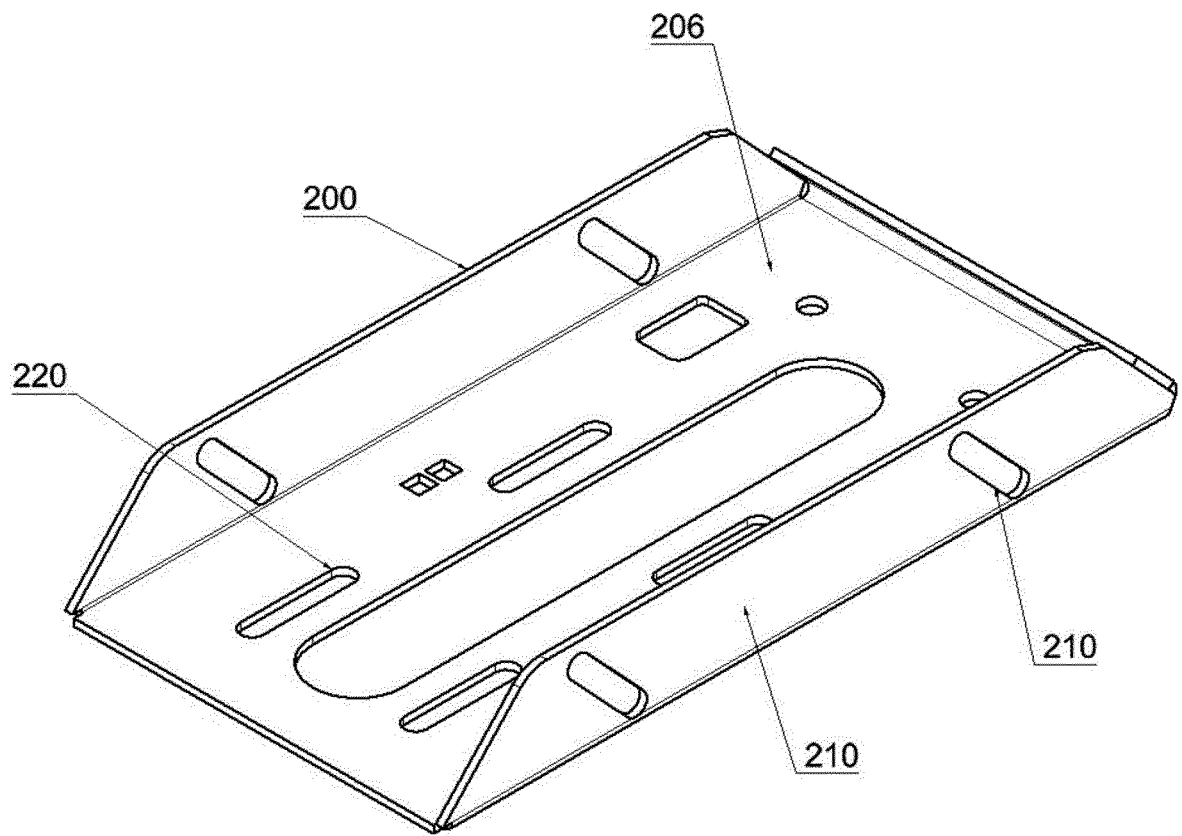
FIG. 8 shows an isometric view of a base frame in accordance with various embodiments of the invention.

FIG. 8 shows an isometric view of a base frame 200 in accordance with various embodiments of the invention. Four recesses 220 are positioned in the bottom part/base wall 206 of the base frame 200. The recesses 220 are adapted for receiving bolts for rigid attachment to the floor of a transport vehicle.

Figure 9:
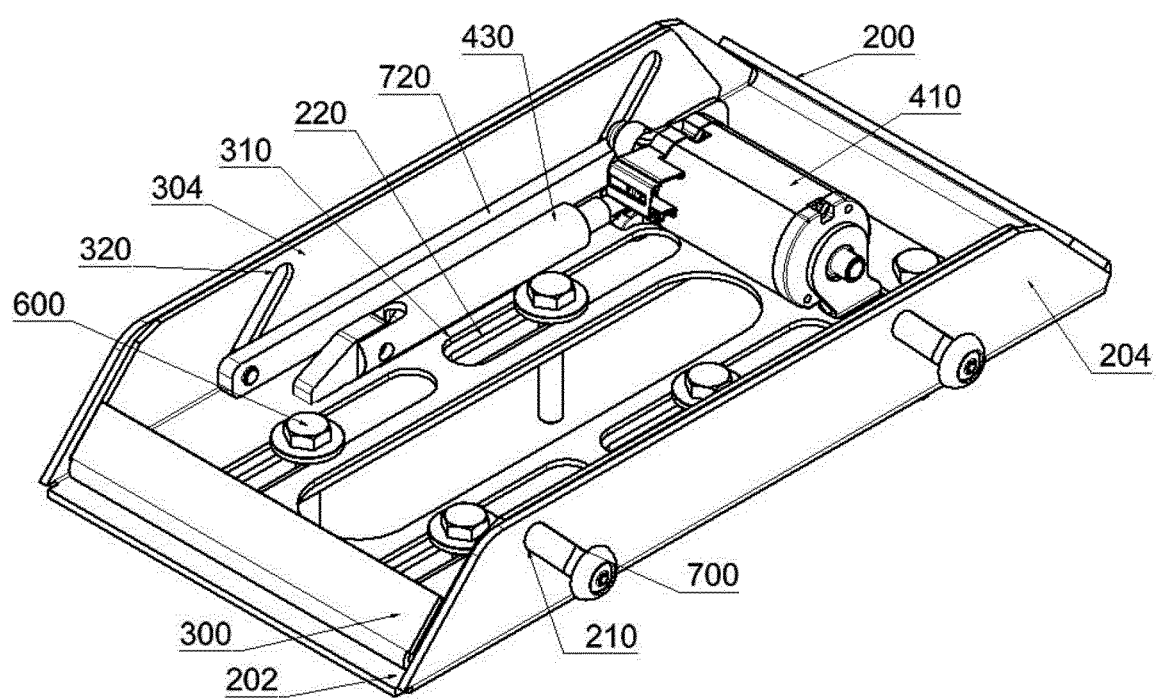
FIG. 9 shows an isometric view of a docking station in accordance with various embodiments of the invention, where the top frame has been removed, and where the middle frame is moved to farthest right position, corresponding to a position where the docking station will be in the lowest configuration.

FIG. 9 shows an isometric view of a docking station in accordance with various embodiments of the invention, where the top frame has been removed, and where the middle frame is moved to farthest right position, corresponding to a position where the docking station will be in the lowest configuration. Notice that it is the guide track 310 that moves relative to the bolt 600.

Figure 10:
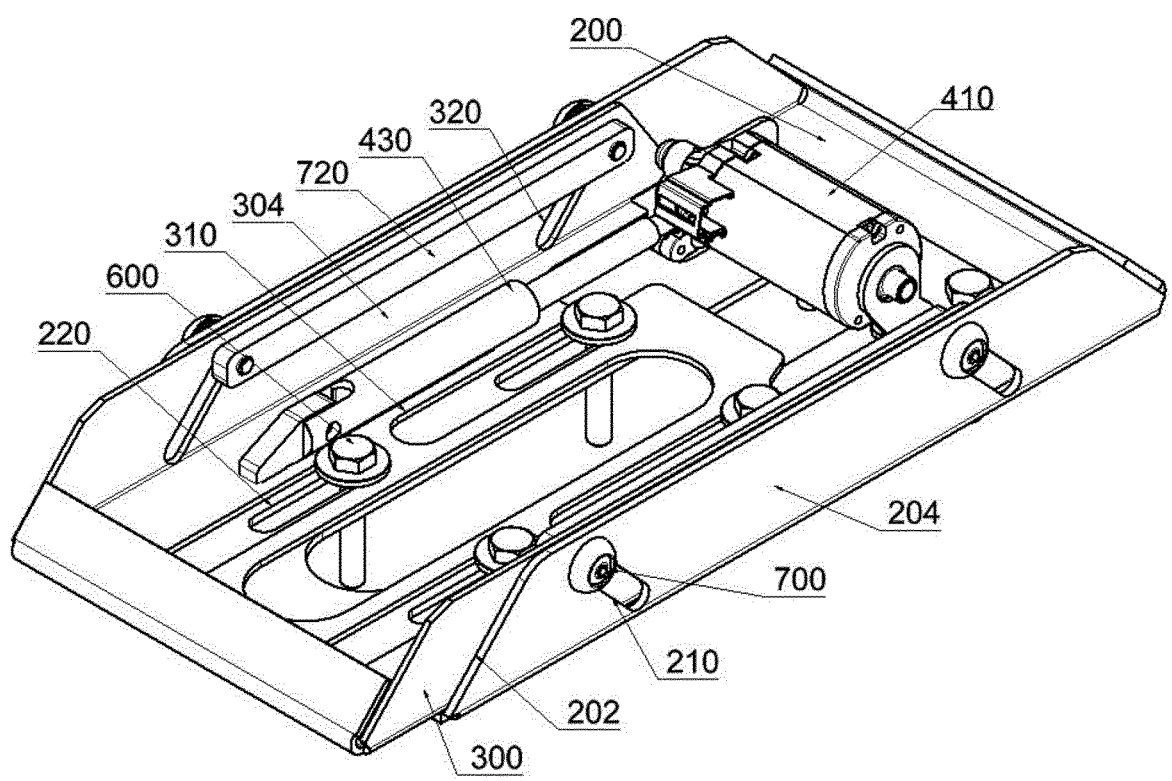
FIG. 10 shows an isometric view of a docking station in accordance with various embodiments of the invention, where the top frame has been removed, and where the middle frame is moved to farthest left position, corresponding to a position where the docking station will be in the tallest configuration.

FIG. 10 shows an isometric view of a docking station in accordance with various embodiments of the invention, where the top frame has been removed, and where the middle frame is moved to farthest left position, corresponding to a position where the docking station will be in the tallest configuration. Notice that it is the guide track 310 that moves relative to the bolt 600. Two pairs of oppositely angled guide tracks 210, 320 are positioned on each side of the docking station; and the guide pins moving therein are joined by an elongate guide member 720.

FIG. 11 shows a top view of a docking station in accordance with various embodiments of the invention, where the top frame has been removed, and where the middle frame is moved to farthest right position, corresponding to a position where the docking station will be in the lowest configuration.

FIG. 12 shows a top view of a docking station in accordance with various embodiments of the invention, where the top frame has been removed, and where the middle frame is moved to farthest left position, corresponding to a position where the docking station will be in the tallest configuration.

FIG. 13 shows a cutout of the sidewalls of the base frame and middle frame through a fastening means and a rolling element.

FIG. 14 shows a cutout of the sidewalls of the base frame and middle frame through a guide pin and a rolling element.

FIG. 15 shows a longitudinal cross-section of a docking station in accordance with various embodiments of the invention, through a fastening means and a rolling element.

FIG. 16 shows a transverse cross-section of a docking station in accordance with various embodiments of the invention, through a guide pin and a rolling element.

REFERENCES

100 Height adjustable wheelchair docking system
200 Base frame
202 Open end
204 Side wall
206 Bottom part/base wall
210 Guide track
220 Recess
300 Middle frame
302 Bottom part/base wall
304 Side wall
310 Guide track
320 Guide track
410 Motor
420 Threaded lever
430 Threaded anchoring unit
500 Top frame
502 Side wall
510 Channel
600 Fastening means/Bolt
610 Rolling element/roller bearing
700 Guide pin
710 Rolling element/roller bearing
720 Elongate guide member

The invention claimed is:

1. A height adjustable wheelchair docking system (100) adapted for releasably securing a wheelchair to a floor of a transport vehicle comprising:
   a base frame (200) with an open end (202), and adapted for rigid attachment to the floor of a transport vehicle;
   a middle frame (300) adapted for sliding back and forth in a horizontal direction within the base frame (200) and through the open end (202);
   means configured to slide the middle frame (300) in relation to the base frame (200); and
   a top frame (500) adapted to cover and encompass the base frame (200) and middle frame (300), and in its entirety adapted to move up and down in a vertical direction in relation to the base frame (200) when the middle frame (300) is sliding back and forth in a horizontal direction within the base frame (200) and through the open end (202); wherein the top frame (500) further comprises a female or male docking fixture adapted for locking engagement with a male or female docking fixture on a wheelchair.

2. The height adjustable wheelchair docking system (100) according to claim 1, wherein the means configured to slide the middle frame (300) in relation to the base frame (200) comprises a motor (410) coupled to a threaded lever (420), and a threaded anchoring unit (430) adapted for engaging with the threaded lever (420); wherein a) the motor (410) coupled to the threaded lever (420) is attached to the base frame (200), and the threaded anchoring unit (430) is attached to the middle frame (300), or b) the threaded anchoring unit (430) is attached to the base frame (200), and the motor (410) coupled to the threaded lever (420) is attached to the middle frame (300).

3. The height adjustable wheelchair docking system (100) according to claim 1, wherein the means configured to slide the middle frame (300) in relation to the base frame (200) is configured to horizontally slide the middle frame (300) to a predefined position relative to the base frame (200) in response to a user input signal.

4. A method of using a height adjustable wheelchair docking system according to claim 1, comprising releasably securing the wheelchair to the floor of the transport vehicle by docking the docking fixture on the wheelchair to the docking fixture on the top frame to enable said locking engagement and to enable height adjustment by sliding the middle frame back and forth in the horizontal direction within the base frame and through the open end so as to move up and down in the vertical direction in relation to the base.

5. A method comprising installing in the transport vehicle the base frame, the middle frame, the top frame and the female or male docking fixture, according to claim 1, for locking engagement with the male or female docking fixture on the wheelchair in the transport vehicle.

6. A height adjustable wheelchair docking system (100) adapted for releasably securing a wheelchair to a floor of a transport vehicle comprising:
 a base frame (200) with an open end (202), and adapted for rigid attachment to the floor of a transport vehicle;
 a middle frame (300) adapted for sliding back and forth in a horizontal direction within the base frame (200) and through the open end (202);
 means configured to slide the middle frame (300) in relation to the base frame (200); and
 a top frame (500) adapted for covering at least a part of the base frame (200) and middle frame (300), and adapted to move up and down in a vertical direction in relation to the base frame (200) when the middle frame (300) is sliding back and forth in a horizontal direction within the base frame (200) and through the open end (202); wherein the top frame (500) further comprises a female or male docking fixture adapted for locking engagement with a male or female docking fixture on a wheelchair, wherein the middle frame (300) comprises guide tracks (310) in the bottom part (302), and wherein at least a part of a fastening means adapted for providing rigid attachment of the base frame (200) to the floor of the transport vehicle is configured for sliding and/or rollable engagement with said guide tracks (310).

7. The height adjustable wheelchair docking system (100) according to claim 6, wherein the fastening means is a bolt (600), and wherein a part of the bolt (600) is configured for sliding engagement with said guide tracks (310).

8. The height adjustable wheelchair docking system (100) according to claim 6, wherein the fastening means is a bolt (600) comprising a rolling element (610) adapted to be rollable engaged with the sides of said guide tracks (310).

9. The height adjustable wheelchair docking system (100) according to claim 6, wherein the means configured to slide the middle frame (300) in relation to the base frame (200) comprises a motor (410) coupled to a threaded lever (420), and a threaded anchoring unit (430) adapted for engaging with the threaded lever (420); wherein a) the motor (410) coupled to the threaded lever (420) is attached to the base frame (200), and the threaded anchoring unit (430) is attached to the middle frame (300), or b) the threaded anchoring unit (430) is attached to the base frame (200), and the motor (410) coupled to the threaded lever (420) is attached to the middle frame (300).

10. The height adjustable wheelchair docking system (100) according to claim 6, wherein the means configured to slide the middle frame (300) in relation to the base frame (200) is configured to horizontally slide the middle frame (300) to a predefined position relative to the base frame (200) in response to a user input signal.

11. A method of using a height adjustable wheelchair docking system according to claim 6, comprising releasably securing the wheelchair to the floor of the transport vehicle by docking the docking fixture on the wheelchair to the docking fixture on the top frame to enable said locking engagement and to enable height adjustment by sliding the middle frame back and forth in the horizontal direction within the base frame and through the open end so as to move up and down in the vertical direction in relation to the base.

12. A method comprising installing in the vehicle the base frame, the middle frame, the top frame and the female or male docking fixture, according to claim 6, for locking engagement with the male or female docking fixture on the wheelchair in the transport vehicle.

13. A height adjustable wheelchair docking system (100) adapted for releasably securing a wheelchair to a floor of a transport vehicle comprising:
 a base frame (200) with an open end (202), and adapted for rigid attachment to the floor of a transport vehicle;
 a middle frame (300) adapted for sliding back and forth in a horizontal direction within the base frame (200) and through the open end (202);
 means configured to slide the middle frame (300) in relation to the base frame (200); and
 a top frame (500) adapted for covering at least a part of the base frame (200) and middle frame (300), and adapted to move up and down in a vertical direction in relation to the base frame (200) when the middle frame (300) is sliding back and forth in a horizontal direction within the base frame (200) and through the open end (202); wherein the top frame (500) further comprises a female or male docking fixture adapted for locking engagement with a male or female docking fixture on the wheelchair, wherein the base frame (200) and the middle frame (300) each comprises one member of a pair of oppositely angled guide tracks (210, 320) in their side wall (204, 302); wherein the top frame (500) comprises a channel (510) in its side wall (502); wherein the pair of oppositely angled guide tracks (210, 320) and the channel (510) together form a channel in which a guide pin (700) is positioned.

14. The height adjustable wheelchair docking system (100) according to claim 13, wherein the guide pin (700) comprises a rolling element (710) adapted to be rollable engaged with the sides of the oppositely angled guide tracks (210, 320).

15. The height adjustable wheelchair docking system (100) according to claim 13, wherein the means configured to slide the middle frame (300) in relation to the base frame (200) comprises a motor (410) coupled to a threaded lever (420), and a threaded anchoring unit (430) adapted for engaging with the threaded lever (420); wherein a) the motor (410) coupled to the threaded lever (420) is attached to the base frame (200), and the threaded anchoring unit (430) is attached to the middle frame (300), or b) the threaded anchoring unit (430) is attached to the base frame (200), and the motor (410) coupled to the threaded lever (420) is attached to the middle frame (300).

16. The height adjustable wheelchair docking system (100) according to claim 13, wherein the means configured to slide the middle frame (300) in relation to the base frame (200) is configured to horizontally slide the middle frame (300) to a predefined position relative to the base frame (200) in response to a user input signal.

17. A method of using a height adjustable wheelchair docking system according to claim 13, comprising releasably securing a wheelchair to the floor of a transport vehicle by docking the docking fixture on a wheelchair to the docking fixture on the top frame to enable said locking engagement and to enable height adjustment by sliding the middle frame back and forth in the horizontal direction within the base frame and through the open end so as to move up and down in the vertical direction in relation to the base.

18. A method comprising installing in the vehicle the base frame, the middle frame, the top frame and the female or male docking fixture, according to claim 13, for locking engagement with the male or female docking fixture on the wheelchair in the vehicle.

\* \* \* \* \*